Esteban J. Toscano,
INVENTOR.
BY.

AGENT.

Esteban J. Toscano,
INVENTOR.

BY.

AGENT.

United States Patent Office 3,218,532
Patented Nov. 16, 1965

3,218,532
NUMERICALLY CONTROLLED POSITIONING
SYSTEM
Esteban J. Toscano, Los Angeles, Calif., assignor to
Hughes Aircraft Company, Culver City, Calif., a
corporation of Delaware
Filed Dec. 3, 1962, Ser. No. 241,630
8 Claims. (Cl. 318—28)

This invention relates generally to electrical control systems and more particularly to numerically programmed systems for controlling power operated devices.

In this connection illustrative reference is made to positioning systems such as found in machine tool controls, for instance, wherein movable platens or tables, spindles, etc., are positioned in one or more axes in accordance with programs defined in some suitable type of numerical code.

Programs for machine tools may be prepared on a variety of storage mediums ranging from magnetic drums to perforated tapes or cards. Although the programs written on such mediums may be altered without too much difficulty, it is desirable to avoid reworking a program for a particular part unless the part itself is to be changed for some reason. Thus, if a dimension program is written for a part, taking into account the dimension of a particular tool to be used in the machining operation, tool wear may necessitate rewriting the program or replacing the tool.

It is therefore desirable when writing a dimension program for machining a particular part in a machine tool to be able to write the dimension independently of tool dimensions. That is, to write the dimension from a given zero reference position in a particular machine tool axis to the center of the tool spindle where positioning transversely of the tool spindle takes place, or to write the dimension for a tool of standard length where positioning movement paralleling the tool axis takes place. As an alternative, where positioning movement transversely of the tool spindle is to take place, the dimension for positioning of the part, rather than being written to the center of the tool spindle, may be written to accommodate a cutter of standard dimension.

In any event, programming of this type requires a facility for compensating the programmed dimension in the amount required by a particular tool.

Accordingly, one object of this invention is to provide an improved numerically controlled positioning system which minimizes the need for alteration in a numerical control program.

It is also an object of this invention to provide a positioning system for a machine tool which permits writing a dimensional program independently of specific cutter dimensions by providing a facility for compensating the dimensioned program in accordance with the dimensions of specific cutters.

An ancillary object of this invention is to provide a facility permitting the addition of two numbers in a one-way counter or register.

The aforesaid and other objects and advantages are accomplished in accordance with one embodiment of this invention in an electrical control system which is directed to a numerically programmed type of machine tool control including a facility for compensating cutter dimensions.

The machine tool control includes suitable information input equipment such as a tape reader system defining a program of operation for the tool and particularly defining specific dimensions for positioning a particular part. The output of such a tape reader may be in binary coded decimal form in a serial parallel type of information system. The output of such a tape reader is usually applied to a suitable type of electrical control which includes a distributor for distributing serially presented groups of discrete signals to different storage points in the system for the purpose of controlling the machine tool. Such storage points may include position counters or counting registers which store discrete signals defining desired positions of the several movable machine tool members in their respective axes of freedom.

The system also includes a suitable incremental position transducers operated by the movable members in the several axes of freedom for the purpose of producing signals representing increments of displacement as the members are moved in their respective axes to thereby provide a count of actual positioning movements which is compared in any suitable manner with the contents of the position counters which latter indicate desired positions in the respective axes.

The incremental position transducers for the purposes of this discussion are assumed to have a fixed zero or reference position representing the point in a particular axis at which the count of increments of positioning movement starts. Where a position counter or counting register is employed to indicate a desired position of a member in its axis of freedom, the signals generated with each increment of displacement by the incremental position transducers as positioning movement takes place may be applied to the position counter or counting register. The counter is preferably arranged to provide count-down operation. At the time the position counter is counted down to zero, or to some other predetermined minimum count which in a particular system represents the desired position, the movable member is stopped and positioning is completed.

The use of a count-down counter or counting register in a system of this type provides certain simplifications in the equipment required to translate the program on the tape to a final position of a part which is being moved in the machine and, in accordance with the teachings of this invention, equipment requirements are maintained at a minimum level while additionally providing a facility which compensates for a condition identified herein as cutter offset, resulting from the use of a cutter which is of some nonstandard dimension.

In this respect, in accordance with this invention, the count-down counter or counting register is provided with an additional minimal storage facility which permits the addition of two numbers therein, the first being a number set therein from the programmer, that is, the tape reader system, and the second being a number set therein in accordance with an adjustment required in the desired position of the part being positioned with respect to that position which has been programmed by the tape reader system.

Such an additional facility may include any suitable type of programmer which contains the dimension which is to be used to compensate the standard programmed dimension and, in one particular embodiment of this invention, is represented in the electrical output of a binary coded switch system which is manually adjusted to provide an electrical output, depicted in the electrical state of the several switches, which in binary coded decimal form represents the cutter offset dimensions. These switches are coupled to suitable flip flops in the count-down counter to provide compensation of the programmed dimension for desired position in accordance with the requiments of a specific cutter.

Other objects and advantages will become apparent from a study of the following specifications when considered in conjunction with the accompanying drawings in which.

Figure 1:
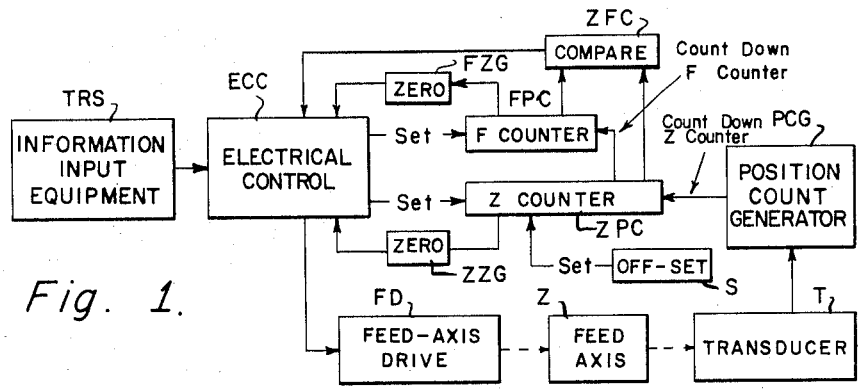
FIGURE 1 is a block diagram of an electrical control system embodying the principles of this invention.

The electrical control system of this invention is illustrated in block form in FIG. 1. The details of such a system are illustrated and described in a copending application of J. K. Holy, entitled "Electrical Control System," Serial No. 225,725, filed September 24, 1962, and assigned to the assignee of this invention. Further particular details of an arrangement of this type may be had by reference to a copending application of E. J. Toscano, entitled "Electrical System of Control," Serial No. 184,204, filed April 2, 1962, and assigned to the assignee of this invention. The block diagram of FIG. 1 in the present application corresponds in many respects to that illustrated in FIG. 4 of the application of J. K. Holy aforesaid.

With reference to FIG. 1, the information input equipment may include any suitable type of discrete signal program. For the purpose of this discussion it will be assumed to include a suitable tape reader system having a perforated tape which may be read by suitable types of photoelectric transducers, such as self-generating photoelectric devices. These photoelectric devices occupy one impedance or voltage state when dark and a second impedance or voltage state when illuminated with light.

The output of such information input equipment in the form of serially presented parallel signal groups is distributed by a suitable electrical control designated ECC to respective Z and F counting registers or position counters designated ZPC and FPC. The discrete tape signals preset the position counters. The coupling between the electrical control and the Z and F position counters ZPC and FPC is represented in the connections designated Set.

The outputs of the Z and F counters are compared in a Z and F comparator circuit ZFC having an output when the counter contents are different, that is, having an output whenever the contents of the Z position counter ZPC are greater than the contents of the F position counter FPC. This electrical output is applied to the electrical control circuit ECC which now produces an electrical output applied to a feed axis drive FD effecting movement in the feed axis or spindle axis Z as indicated by the dotted connection between the two named blocks. At this time movement takes place at traverse rate.

The output of the feed axis Z, that is, its mechanical movement, operates a suitable transducer designated T. Such a transducer may be of the type indicated in Patent No. 2,848,698 of T. T. Kumagai et al., issued August 19, 1958, and assigned to the assignee of this invention. As described in this patent, such a transducer may utilize a pair of magnetic heads producing time varying output voltages which are in quadrature phase relationship and which are of the same frequency.

These output signals are applied to a suitable position count generator PCG which may be of the type described in a copending application of M. R. McElroy, Serial No. 850,435, filed November 2, 1959, entitled "Condition Responsive Electrical System" and assigned to the assignee of this invention.

The electrical output of the position generator is in the form of discrete signals such as voltage pulses, each representing a predetermined increment of displacement in the specific feed axis. These output signals are coupled to the count-down input circuit of the Z position counter ZPC which is now counted down from a preset condition.

At such time as the contents of the Z counter equals the contents of the F counter the Z and F counter comparator circuit ZFC produces a suitable electrical signal which is coupled to the electronic control ECC which now produces an electrical output, switching the feed axis drive from traverse rate to feed rate. The feed axis Z now moves at the desired feed rate for the particular machine operation which is to take place.

At such time as the count in the Z counter goes to zero, or some other arbitrary predetermined minimum value indicating that final position has been reached, the Z zero gate ZZG produces an electrical output which is coupled to the electrical control ECC. The control afforded by the output of the Z zero gate stops movement of the feed axis and effects reversal in the feed axis. Retraction now takes place at some programmed rate.

If retraction is to take place at the programmed feed rate the F counter is counted down as indicated by the count-down connection from the Z counter to the F counter. In this mode of operation the output of the position count generator PCG which, it will be recalled, is in the form of pulses, operates the Z counter. Both the Z and F counters are comprised of several levels of flip flops, which in the Z counter are weighted units, tens, hundreds, thousands and tens of thousands. To minimize the need for a correspondingly large F counter, this circuit provides for the coupling of the units and tens flip flop levels of the Z counter as input to the F counter.

At such time as the F counter is counted to zero the output of the F zero gate FZG which is coupled to the electrical control operates to stop movement in the particular feed axis.

Details concerning a system such as this may be had by reference to the copending application of J. K. Holy aforesaid, and also by reference to the copending application of E. J. Toscano aforesaid.

To provide for offset in a particular axis for any purpose whatsoever and, by way of example, for compensating for cutter offset as referred to hereinabove, this invention provides a facility associated with the Z position counter ZPC, designated in FIG. 1 as an offset correction S, the output of which, as indicated, is coupled to the Z position counter ZPC and utilized also as a setting function with respect to the flip flops therein. Thus, for the purpose of this discussion, if movement of the order of 4 inches is desired in a particular axis, say for a counterboring operation, this dimension then would be programmed on the tape and would be set into the counter. However, if the particular tool which is used had been resharpened and had a dimension of 0.007 inch under size, then an additional displacement of 0.007 inch would be necessary in order to properly machine the part. This additional dimension would therefore be introduced to the counter via the Set input from the offset device S. Hence, the total contents of the counter at this point would be 4 inches as read from the tape, plus 0.007 inch as provided by the device S, and the total movement of the part to the actual position needed for proper machining would be 4.007 inches.

Counters of the type of the Z position and F position counters ZPC and FPC, respectively, may be of any suitable conventional type providing a count-down type of operation, and to this end may comprise successive flip flop stages which are arranged so that the lower order flip flops controls the higher order flip flops in a cascaded flip flop arrangement to achieve count-down counter operation. A typical flip flop for such a counter may be of the type illustrated in FIG. 2 herein. This flip flop is described in connection with FIG. 4 of the application of E. J. Toscano aforesaid and is reproduced herein to facilitate understanding of this invention.

This flip flop comprises a pair of transistors Q11 and Q12 of the PNP type which are connected in grounded emitter configuration. The bases and collectors of these transistors are crossconnected in respective voltage divider circuits, the first of which includes resistors R22, R23 and R24, and the second of which includes resistors R25, R26 and R27. The base of transistor Q11 is connected to the common terminal of resistors R22 and R23 of the first named voltage divider and the base of transistor Q12 is connected to the common terminal between resistors R25 and R26 of the second named voltage divider. The collector of transistor Q11 is connected to the common terminal between resistors R26 and R27 of the second voltage divider and the collector of transistor Q12 is connected to the common terminal of resistors R23 and R24 of the first voltage divider.

The respective voltage dividers, during operation of the flip flop, are normally connected between +25 volts and −25 volts. For the purpose of presetting the flip flop to one of its two stable states a selected one of the terminals S or R on the voltage divider circuit may be connected momentarily to −150 volts. When −150 volts is connected to terminal S, for instance, the flip flop is turned on, its "1" representing electrical state, and when −150 volts is connected to the terminal R the flip flop is turned off, its "0" representing electrical state. While the application of −150 volts is shown only to the terminal S by means of a circuit, yet to be described, it is to be understood that this voltage may be applied to either of the terminals S or R, depending upon the electrical state the flip flop is to be set in prior to operation.

Resistors R23 and R26 are respectively shunted by capacitors C6 and C7. Resistors R23, capacitor C6 and resistor R26, capacitor C7, constituting, respectively, the crosscoupling circuits, connect the collector of one transistor to the base of the other transistor to provide fast triggering.

The base circuits of the transistors are, respectively, provided with steering voltage connections to provide switching of the flip flops from one electrical state to the other without uncertainty. These circuits include resistor R28, diode D14 and resistor R29, diode D15 in series, respectively, between the collector and base of the transistor.

The flip flop illustrated may be identified as a J-K type of flip flop in which the applications of input signals to the J input terminal of the flip flop set the flip flop of its "1" representing or "Q" electrical state, and applications of input signals to the K input terminal of the flip flop result in setting of the flip flop to its "0" representing or "$\bar{Q}$" electrical state.

J input signals at terminal $J_p$ are applied to the base of transistor Q12 through a coupling capacitor C8 and the diode D15. K input signals are applied at the terminal $K_p$ or $K_n$ to the base of transistor Q11. Coupling capacitor C9 and C11 couple the respective $K_p$ and $K_n$ terminals to the anode of the diode D14 in the base circuit of transistor Q11.

Another input terminal designated $8In$ is coupled through a coupling capacitor and a diode D18 to the base of transistor Q11.

Clamping diodes D16 and D17 are provided, respectively, at the collector circuits to apply a clamping voltage of −2 volts as indicated such that when either transistor Q11 or Q12 is not conducting the associated collector circuit will be clamped at about −2 volts.

The "on" or "1" representing electrical state of this flip flop is approximately a −2 volt voltage state at collector terminal Q and the "off" or "0" representing electrical state is approximately a zero or ground voltage condition at the terminal Q. When the terminal Q is at −2 volts the terminal $\bar{Q}$ is at zero volts. When the terminal Q is at zero volts the terminal $\bar{Q}$ is at −2 volts. For the flip flop to be in its "on" or "1" representing electrical state transistor Q11 is conducting and transistor Q12 is nonconducting. Under this condition the terminal Q is at −2 volts as determined by the voltage clamp at diode D16. As a consequence of current flow in the collector circuit of transistor Q11, including resistor R27, the $\bar{Q}$ terminal of the flip flop will be at approximately "0" volts, in which case the clamping diode D17 is backbiased.

The flip flop is triggered between its two electrical states by cutting off the conducting transistor through application of a positive going voltage pulse to its base. The steering voltage applied by the steering voltage circuits, including resistors R28 and R29, permit control of the flip flop by the simultaneous application of flip flop triggering pulses to both the $J_p$ and $K_p$ input terminals.

Figure 2:
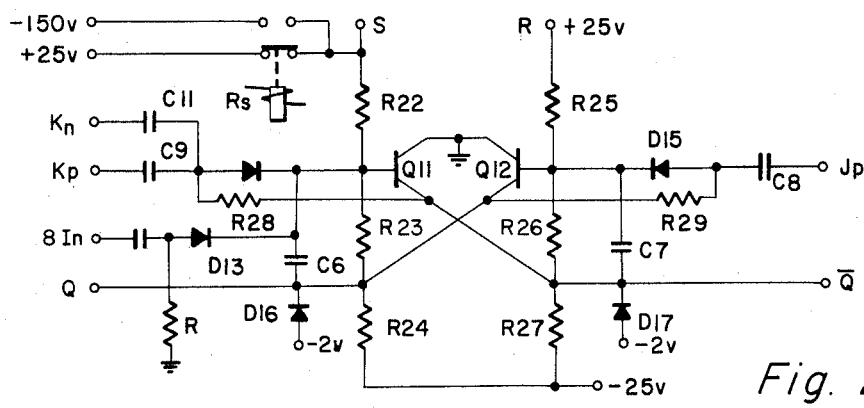
FIG. 2 illustrates a typical flip flop of the type which is employed in the counter circuits of this invention.

FIG. 2 also illustrates a specific circuit for setting the flip flop in its "1" representing electrical state using the principle of negative base bias to effect switching of transistor Q11. This provision, with reference to the flip flops of the Z and F counters, includes the contacts of a flip flop setting relay RS. This relay is provided with a set of normally closed contacts which connects +25 volts to the terminal S and a set of normally open contacts which when closed couple −150 volts to the terminal S. For the arrangement illustrated the relay RS is normally deenergized, in which case the terminal S is coupled to 25 volts. The terminal R is indicated as being coupled to 25 volts. In order to set the flip flop into its "1" representing electrical state the relay RS is energized. As described in the application of E. J. Toscano, supra, energization of relay RS takes place when row 1 of the tape is being read. In this condition −150 volts is coupled through the resistor R22 to the base of flip flop Q11. This drives the base of the transistor Q11 negatively with respect to the emitter and transistor conduction takes place. As long as this voltage is applied to the flip flop the flip flop is held in this electrical state, even though positive voltage pulses may be applied to the terminals $J_p$ and $K_p$. With transistor Q11 conducting as described, the output terminal Q is clamped at −2 volts and the output terminal $\bar{Q}$ is approximately at zero volts or ground potential and the flip flop is in its "1" representing electrical state.

Figure 4:
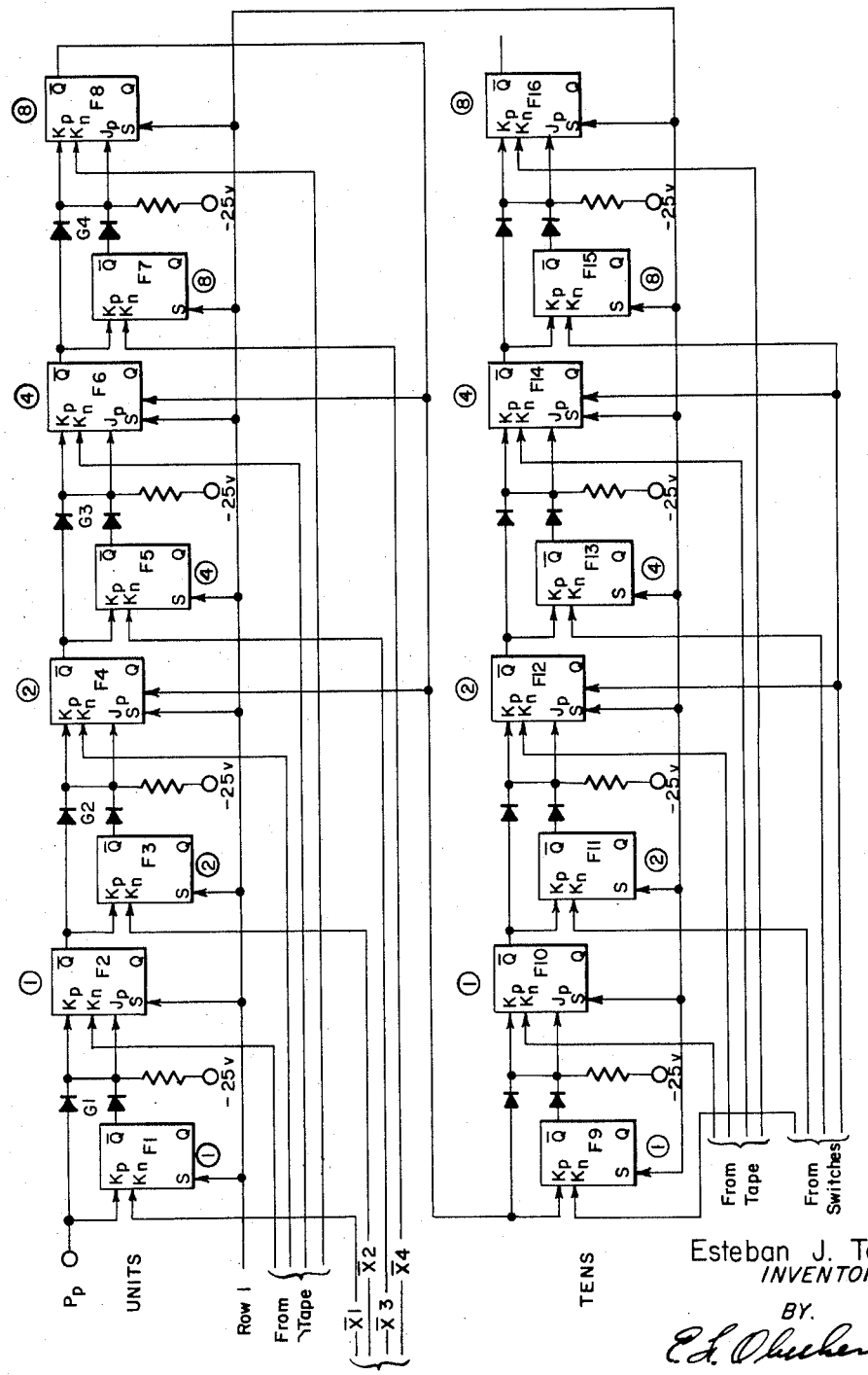
FIG. 4 is a block diagram specifically illustrating a count-down type of counter having a facility for adding two numbers.

The details of the count-down counter are illustrated in part in FIG. 4.

As shown in the application to E. J. Toscano, supra, the count-down counter comprises a plurality of cascaded flip flops in which four flip flops are utilized for each of the units, tens, hundreds and thousands level, and two flip flops are in the ten thousands level to provide a total count, expressed as decimal number of 39,999. The input pulses which are derived from the position count generator forming a part of the transducer system are applied through the $J_p$ and $K_p$ input terminals of the least significant (first) flip flop of the counter. The $\bar{Q}$ output circuit of each flip flop is coupled to the $J_p$ and $K_p$ input terminals of the next higher order level of flip flop providing triggering of each higher order of flip flop as the connected lower order flip flop goes from its "0" representing electrical state, in which the $\bar{Q}$ output voltage is in the lower of its two voltage states, to its "1" representing electrical state in which the $\bar{Q}$ output voltage swings from the lower of its two electrical states to the higher of its two electrical states, namely, about −2 volts to ground potential. Thus, at any time a lower order flip flop switches from its "0" or $\bar{Q}$ electrical state, a triggering voltage pulse is coupled to the $J_p$ and $K_p$ input terminals of the next higher order flip flop, causing this flip flop to change from the electrical state it is in to its opposite electrical state, whence the count is transmitted from one flip flop to another to achieve a count-down mode of operation.

This circuit concept for a count-down counter is incorporated in the circuit illustrated in FIG. 4 herein. In FIG. 4 only the units and tens level of a binary coded decimal count-down counter are shown, it being understood that the other levels of this counter may be connected in the manner demonstrated in these two counter levels. To this end, in the units section of the counter the flip flops F2, F4, F6 and F8 represent the standard counter flip flop corresponding, for instance, to the flip flops FQx1 through FQx4 in the application of E. J. Toscano, supra, and the flip flops F10, F12, F14 and F16 will correspond to the flip flops of the tens level, FQx5 through FQx8. In the units row in FIG. 4 herein control flip flops F1, F3, F5 and F7 are connected ahead of each of the counter flip flops F2, F4, F6 and F8 to provide a control of these counter flip flops for counting purposes, depending upon the amount of correction that is required in the dimension information that is being read from the tape. Similarly, flip flops F9, F11, F13 and F15 are connected ahead of each of the counter flip flops F10, F12, F14 and F16, respectively, in the tens level of the counter. The control of the counter flip flops by means of the control flip flop is accomplished by means of gating circuits which in the units level of the counter are designated G1, G2, G3 and G4, respectively, and which are arranged to be enabled in the presence of negative output voltages from the control flip flops F1, F3, F5 and F7, respectively. A similar set of gates couples the flip flops F9, F11, F13 and F15 to the respective counter flip flops in the tens level of the counter. The description of the operation of the flip flops in the units level of the counter will suffice for both levels.

As illustrated, and with particular reference to the gate G1 (this gate description applies to all of the other gates), each gate comprises a pull-down resistor RD having one terminal connected to −25 volts and the other terminal commonly connected to the cathodes of respective gate diodes GD1 and GD2. At such time as the output voltage of the $\bar{Q}$ terminal of flip flop F1 is a ground potential, the output of the gate is coupled to ground potential. At this time the application of a positive going voltage pulse $P_p$ swinging from some negative voltage to ground potential is inhibited at the output of the gate, that is, the voltage pulse does not drive the output of the gate above its existing static voltage level at about ground potential. At such time as the output $\bar{Q}$ terminal of the flip flop F1 is at the lower of its two voltage states, a voltage pulse coupled to the diode GD1 and swinging from some negative potential towards ground potential correspondingly raises the output of the gating circuit G1. This output is coupled to both the $J_p$ and $K_p$ input terminals of the flip flop F2 which, as described in connection with FIG. 2, causes this flip flop to change its electrical state. Thus, at any time the flip flop F1 is in its "0" representing electrical state ($\bar{Q}=-2$ volts), signals $P_p$ are gated by the gate G1 to the inputs $J_p$ and $K_p$ of the flip flop F2, and at such time as the flip flop F1 is in its "1" representing electrical state, the output of the terminal $\bar{Q}$ is high and the output of the gate G1 is high, which inhibits the pulses $P_p$ at the input terminals $J_p$ and $K_p$ of the flip flop F2.

Whenever the flip flop F1 is in its "1" representing electrical state an input pulse $P_p$ applied to the $K_p$ input terminal thereof switches the flip flop F1 from its "1" representing electrical state to its "0" representing electrical state, thus enabling the gate. The second pulse $P_p$ which is applied is now gated to the flip flop F2, causing this flip flop to change its electrical state. By this expedient the flip flop F1 is effective in adding one count to the count-down operation. Similar considerations apply with respect to the flip flops F3, F5 and F7.

The flip flops of the counter are weighted 1, 2, 4 and 8 in each of the levels indicated and to achieve binary coded decimal counting the $\bar{Q}$ output of the flip flop F8 is coupled as input to terminals $8I_n$ of the flip flops F4 and F6. Thus, at any time that the flip flop F8 goes from its "0" representing electrical state to its "1" representing electrical state, signals are coupled to the terminals $8I_n$ of each of the flip flops F4 and F6 to set these flip flops to their "0" representing electrical states, if they are not already in such electrical states. Thus, in counting, the counter may exist momentarily in the configuration 1111 for the flip flops F2, F4, F6 and F8, respectively, but then, promptly, the flip flops F4 and F6 are switched to their "0" representing electrical states, resulting in a counter configuration of the units level representing the decimal number "9." The tens level is similarly connected and thus undergoes similar configuration but is weighted ten times the units level and thus represents the decimal number "90" when in the 1001 configuration.

As described in the application of E. J. Toscano, supra, the counter flip flops F2, F4, F6 and F8 are set by the control afforded by relay RS whenever row 1 of the tape is being read. This applies −150 volts to the S terminal of each flip flop forcing transistor Q11 to conduct and setting each flip flop in its "1" representing electrical state. As further described in said Toscano application, the absence of a hole in the tape is effective to turn off any flip flop set in its "1" representing electrical state. Thus, the control from the tape coupled to the $K_n$ input terminal of each flip flop is effective to leave this flip flop in its "1" representing electrical state whenever there is a hole in the tape, or to turn off the flip flop with the absence of a hole in the tape. Thus, the counter may be set to a particular electrical configuration representing a particular decimal number corresponding to a dimension indicating the desired position of the part in a particular axis.

At the time the relay RS is energized, each of the flip flops F1, F3, F5, F7, F9, F11, F13, F15, etc., are also set in their "1" representing electrical states. If an offset correction is to be made this correction is then coupled to the input terminals $K_n$ of each of the control or correction flip flops. The introduction of such a correction may be obtained by means of a switch arrangement of the type illustrated in FIG. 3 and generally designated S which correction is to be made this correction is then coupled viously described. The switch S comprises a knob K which may be set to any one of the ten positions indicated 0 through 9 and is shown in position 7 providing a setting of 0.007 inch. The knob K is mechanically connected to each of the switch sections S1 through S4 and operates the movable switch elements thereof. The switches S1 through S4 are weighted 1, 2, 4 and 8 in correspondence with the weighting of the flip flops in the respective levels of the counter. Each switch is provided with two output terminals designated "1" and "0," respectively. Only the "0" output terminal is utilized in controlling the control flip flops. These terminals are identified $\bar{X}1$, $\bar{X}2$, $\bar{X}3$ and $\bar{X}4$, respectively, which legends are applied in the circuits coupled to the $K_n$ input terminals of the flip flops F1, F3, F5 and F7 in FIG. 4. The convention adopted here corresponds to that in controlling the flip flops from the tape, namely, at any time that a zero is represented in the position of a switch the particular flip flop coupled thereto is turned off.

Table I illustrates a typical condition and applies only to the units level of the counter. In this table it is assumed that the flip flops F2, F4, F6 and F8 are initially set to represent the decimal number 9, that is, 1001 reading F2 through F8, which in the units level represents 0.009 inch. The flip flops F1, F3, F5 and F7 are set to represent the decimal number 7 wherein the flip flops F1, F3 and F5 are each in their "1" representing electrical states and the flip flop F7 is in its "0" representing electrical state, representing 0.007 inch in the units level. Thus, prior to the application of a pulse $P_p$ to the input of the counter, the flip flops occupy the positions indicated in row zero of Table I. Since the flip flop F1 is in its "1" representing electrical state, the gate G1 is disabled and consequently the first pulse $P_p$ is not coupled to the flip flop F2 but is coupled only to the $K_p$ input terminal of the flip flop F1. The positive going voltage excursion at the base of transistor Q11 of this flip flop cuts off transsistor Q11 and results in switching on of transistor Q12. The flip flop F1 now changes its electrical state and the $\bar{Q}$ output terminal goes from the higher of its two voltage states to the lower of its two voltage states, namely, about —2 volts. This enables the gate G1.

*Table I*

| Pulse No. | 1 | | 2 | | 4 | | 8 | |
|---|---|---|---|---|---|---|---|---|
| | F1 | F2 | F3 | F4 | F5 | F6 | F7 | F8 |
| 0 | | 1 | | 0 | | 0 | | 1 |
| | 1 | | 1 | | 1 | | 0 | |
| 1 | | 1 | | 0 | | 0 | | 1 |
| | 0 | | 1 | | 1 | | 0 | |
| 2 | | 0 | | 0 | | 0 | | 1 |
| | 0 | | 1 | | 1 | | 0 | |
| 3 | | 1 | | 0 | | 0 | | 1 |
| | 0 | | 0 | | 1 | | 0 | |
| 4 | | 0 | | 0 | | 0 | | 1 |
| | 0 | | 0 | | 1 | | 0 | |
| 5 | | 1 | | 1 | | 0 | | 1 |
| | 0 | | 0 | | 0 | | 0 | |
| 6 | | 0 | | 1 | | 0 | | 1 |
| | 0 | | 0 | | 0 | | 0 | |
| 7 | | 1 | | 0 | | 0 | | 1 |
| | 0 | | 0 | | 0 | | 0 | |
| 8 | | 0 | | 0 | | 0 | | 1 |
| | 0 | | 0 | | 0 | | 0 | |
| 9 | | 1 | | 1 | | 1 | | 0 |
| | 0 | | 0 | | 0 | | 0 | |
| 10 | | 0 | | 1 | | 1 | | 0 |
| | 0 | | 0 | | 0 | | 0 | |
| 11 | | 1 | | 0 | | 1 | | 0 |
| | 0 | | 0 | | 0 | | 0 | |
| 12 | | 0 | | 0 | | 1 | | 0 |
| | 0 | | 0 | | 0 | | 0 | |
| 13 | | 1 | | 1 | | 0 | | 0 |
| | 0 | | 0 | | 0 | | 0 | |
| 14 | | 0 | | 1 | | 0 | | 0 |
| | 0 | | 0 | | 0 | | 0 | |
| 15 | | 1 | | 0 | | 0 | | 0 |
| | 0 | | 0 | | 0 | | 0 | |
| 16 | | 0 | | 0 | | 0 | | 0 |
| | 0 | | 0 | | 0 | | 0 | |

The second pulse $P_p$ is now coupled directly through the gate to the terminals $J_p$ and $K_p$ of the flip flop F2. Flip Flop F2, as shown, was initially in its "1" representing electrical state and now is switched to its "0" represeting electrical state in which condition its $\bar{Q}$ output terminal switches from its higher to its lower voltage state. This change in voltage in a negative going direction has no effect upon either of the flip flops F3 and F4. As will be seen by reference to Table I, the flip flop F3 is still in its "1" representing electrical state.

With the occurrence of the third voltage pulse $P_p$ the flip-flop F2 is switched from its "0" representing electrical state to its "1" representing electrical state. The output voltage at the $\bar{Q}$ terminal of the flip flop F2 now switches in a positive going direction. This positive going voltage excursion is applied to the $K_p$ input terminal of the flip flop F3 and this flip flop now changes from its "1" representing electrical state, in which position it was initially set, to its "0" representing electrical state in which the output terminal $\bar{Q}$ is now in the lower of its two voltage states.

The occurrence of the fourth voltage pulse $P_p$ switches the flip flop F2 from its "1" representing electrical state to its "0" representing electrical state and no further action takes place.

With the fifth voltage pulse the flip flop F2 is now switched from its "0" to its "1" representing electrical state. The positive going excursion of the terminal $\bar{Q}$ of the flip flop F2 is now coupled through the enabled gate G2 to the input terminals $J_p$ and $K_p$ of the flip flop F4 and this flip flop, which was initially set in its "0" representing electrical state, is now switched to its "1" representing electrical state. The positive going excursion of the terminal $\bar{Q}$ of flip flop F4 which is coupled to the $K_p$ input terminal of the flip flop F5 switches this flip flop from its "1" representing electrical state, in which it was initially set, to its "0" representing electrical state and the switching action terminates with this change.

The cycle may now be followed through pulse No. 16, at which the count-down operation is completed, and all of the flip-flops are in their "0" representing electrical state. These explanations with respect to the units level of the position counter apply equally to the tens, hundreds, thousands and ten thousands level of the counter of the type described in the Toscano application aforesaid.

Thus, it will be seen that the introduction of the control or correction flip flops in the circuit and the coupling of these flip flops through suitable gating circuits to the inputs of the counter flip flops for the purpose of controlling count-down counting operation provides an arrangement in which two numbers may be conveniently added in a count-down type of counter with a minimum of equipment.

Although the explanations which have been made hereinabove apply particularly to count-down counters, it will be understood that these principles are generally applicable to a one-way type of counter, whether it be set for count-down operation or count-up operation. For instance, the counter illustrated herein is conveniently changed to a count-up type of counter by the simple expedient of connecting the Q output terminal of each flip flop to the $J_p$, $K_p$ terminal of the next higher level flip flop in the counter chain so that the occurrence of a pulse $P_p$ at the input $J_p$, $K_p$ of flip flop F2 switching this flip flop, say from its "1" representing electrical state to its "0" representing electrical state, is now instrumental in triggering the next higher order flip flop to change its electrical state. The control flip flops F1, F3, F5, etc., will be coupled in the manner illustrated to similar gating circuits in order to control the count-up operation. Thus, at any time a control flip flop is switched from its "1" state to its "0" state a gate will again be enabled to effect switching of the connected counter flip flop.

Additionally, a binary coded decimal counter is not needed. For instance, the connections from the $\bar{Q}$ output terminals of the flip flops F2 and F16 to the $8In$ input terminals of the respective pairs of flip flops F4, F6 and F12, F14 may be removed to provide a straight binary circuit.

Further, while all flip flops are initially set in their "1" representing electrical states and then selectively turned off, if count-up control is provided, they may be initially set to "0" representing electrical state and then only selected control flip flops are turned on.

Figure 3:
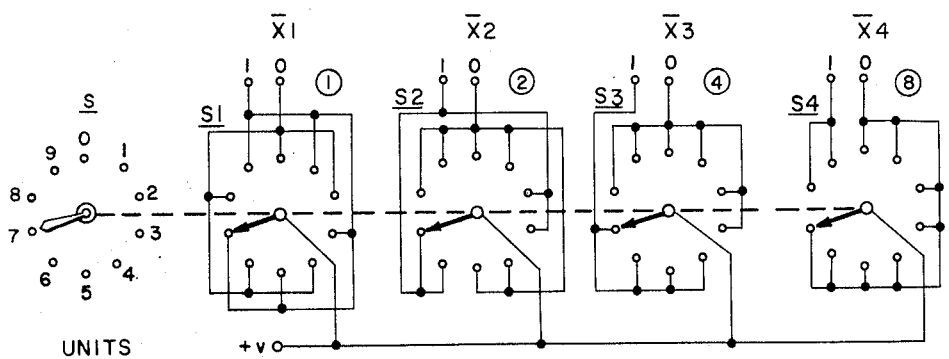
FIG. 3 is an electrical circuit schematically depicting a manually operated switch system for generating discrete electrical signals employed for compensating the position counters.

By the arrangement provided herein a simple and effective control of a numerically controlled positioning system for providing offset in any degree needed within system limits is achieved. The particular arrangements whereby this may be accomplished, which have been disclosed herein, are subject to modification depending upon the types of components which are employed, for instance, the type of flip flop illustrated herein is a transistor flip flop and utilizes a negative voltage state to represent the true state of a particular output terminal. Positive voltage states may be employed. Similarly, transistors need not be used in mechanizing the flip flops and other elements of the circuit. Vacuum tubes may be employed and other types of switching devices, such as magnetic devices, are equally applicable. The use of a switching circuit of the type illustrated in FIG. 3 illustrates one of several types of devices which may be employed and, again, may be modified in accordance with particular needs. It is, therefore, intended that the foregoing disclosure shall be considered only as illustrative of the principles of this invention and not construed in a limiting sense.

What is claimed is:

1. An electrical control system, comprising:
   motor means having a pair of relatively movable members;
   a program device;
   a position transducer system coupled to said members and producing output signals indicative of increments of relative movement of said members;
   a counter having two groups of interconnected flip flops, having an input circuit for receiving signals to be counted and having an output circuit;
   means coupling said program device to the individual flip flops of one group of said two groups of flip flops for setting the flip flops of said one group to predetermined electrical states;
   means coupled to the individual flip flops of the other group of said two groups of flip flops for setting the flip flops of said other group to predetermined electrical states whereby said counter has a predetermined count as determined by the electrical states of the flip flops of said one group and said other group;
   means coupling said position transducer system to said input circuit of said counter for applying said output signals thereto and causing said counter to count from said predetermined count to operate said counter;
   and means coupling said output circuit of said counter to said motor means to control said motor means.

2. An electrical control system, comprising:
   motor means having a pair of relatively movable members;
   a program device;
   a position transducer system coupled to said members and producing output signals indicative of increments of relative movement of said members;
   a counter having two group of interconnected flip flops having an input circuit for receiving signals to be counted and having an output circuit;
   means coupled to the individual flip flops of said two groups for setting the flip flops of one of said groups in the same electrical state and for setting the flip flops of the other group of said two groups in the same electrical state;
   means coupling individual flip flops of said one group of flip flops to said program device for resetting selected flip flops of said one group;
   means coupled to individual flip flops of said other group of flip flops for resetting selected flip flops of said other groups whereby said counter has a predetermined count as determined by the electrical states of the flip flops of said one and said other group;
   means coupling said position transducer system to said input circuit of said counter to operate said counter for applying said output signals thereto and causing said counter to count from said predetermined count;
   and means coupling said output circuit of said counter to said motor means to control said motor means.

3. An electrical control system, comprising:
   motor means having a pair of relatively movable members;
   a discrete signal program device;
   an incremental position transducer system coupled to said relatively movable members and producing individual output signals indicative of increments of relative movement of said members;
   a counter comprising a first set of flip flops and a second set of flip flops respectively coupled to and controlling the flip flops of said first set and having an input circuit for receiving signals to be counted and having an output circuit;
   means coupled to all of said flip flops for setting said flip flops in the same electrical state;
   means coupling said discrete signal program device to individual flip flops of said first set for setting said flip flops of said first set in selected electrical states in accordance with a discrete signal program;
   means coupled to said flip flops of said second set for selectively setting flip flops of said second set in predetermined electrical states whereby said counter has a predetermined count as determined by the electrical states of the flip flops of said first set and said second set;
   means coupling said incremental position transducer system to said input circuit of said counter to operate said counter for applying said output signals thereto and causing said counter to count from said predetermined count;
   and means coupling said output circuit of said counter to said motor means to control said motor means.

4. An electrical control system, comprising:
   motor means having a pair of relatively movable members;
   a numerical program device;
   a position transducer system coupled to said movable members and producing output signals indicative of increments of relative movement of said members;
   a counter including counter flip flops and control flip flops coupled to and controlling respective counter flip flops, said counter having an input circuit for receiving signals to be counted and having an output circuit;
   means coupled to said counter flip flops for setting said counter flip flops in the same electrical state;
   means coupled to said control flip flops for setting said control flip flops in the same electrical state;
   means coupling said program device to said counter flip flops to change the electrical states of selected flip flops of said counter flip flops so that said counter flip flops are in an electrical state which is a predetermined count representative of the numerical program;
   means coupled to said control flip flops to change the electrical states of selected flip flops of said control flip flops for placing said control flip flops in electrical states representative of a change to be made in said predetermined count to provide a new predetermined count;
   means coupling said position transducer system to said input circuit of said counter for applying said output signals thereto and causing said counter to count from said new predetermined count to operate said counter;
   and means coupling said output circuit of said counter to said motor means to control said motor means.

5. An electrical control system, comprising:
   motor means having a pair of selectively movable output members;
   a discrete signal program device;
   an incremental position transducer system coupled to said relatively movable members and producing discrete signals indicative of increments of relative displacement of said members;
a counter comprising a first set of flip flops and a second set of flip flops, said counter having an input circuit for receiving signals to be counted and having an output circuit;
gating means forming part of said counter coupling corresponding flip flops of said first and second sets of flip flops as input to a next higher order flip flop of said first set of flip flops;
means coupled to all of said flip flops for setting said flip flops in the same electrical state;
means coupling said discrete signal program device to the flip flop of said first set of flip flops for changing the electrical state of selected flip flops of said first set of flip flops so that said flip flops of said first set are in electrical states providing a predetermined count in accordance with a discrete signal program;
means coupled to said second set of flip flops to change the electrical states of selected flip flops of said second set to provide predetermined electrical states representative of a change to be made in said predetermined count to provide a new predetermined count;
means coupling said incremental position transducer system to said input circuit of said counter for applying said discrete signals thereto and causing said counter to count from said new predetermined count;
and means coupling said output circuit of said counter to said motor means to control said motor means.

6. An electrical control system, comprising:
motor means having a pair of relatively movable members;
a numerical program device;
a position transducer system coupled to said movable members and producing output signals indicative of increments of relative movement of said movable members;
a count-down counter having interconnected counter flip flops and control flip flops in which respective control flip flops are coupled to and control respective counter flip flops, said counter having an input circuit for receiving signals to be counted and having an output circuit;
means coupled to said counter flip flops for setting the counter flip flops in their "1" representing electrical states;
means coupled to said control flip flops for setting said control flip flops so that all of said control flip flops are in the same electrical state;
means coupling said program device to said counter flip flops to change the setting of selected counter flip flops to provide a predetermined count for said counter;
means coupled to said control flip flops to change the setting of selected control flip flops to provide a new predetermined count for said counter;
means coupling said position transducer system to said input circuit of said counter for applying said output signals thereto to count down said counter from said new predetermined count;
and means coupling said output circuit of said counter to said motor means to control said motor means.

7. An electrical control system, comprising:
motor means having a pair of relatively movable members;
a program device;
a position transducer system coupled to said members and producing output signals indicative of increments of relative movement of said members;
a counter having an input circuit and an output circuit and having interconnected counter flip flops and individual control flip flops coupled between successive counter flip flops for controlling the higher order flip flop in each case;
means coupled to said counter flip flops for setting said counter flip flops in the same electrical state;
means coupled to said control flip flops for setting said control flip flops in the same electrical state;
means coupling said program device to said counter flip flops to change the electrical state of selected counter flip flops to provide a predetermined count for said counter;
means coupled to said control flip flops to change the electrical state of selected control flip flops to provide a new predetermined count for said counter;
means coupling said position transducer system to said input circuit of said counter to cause said counter to count from said new predetermined count;
and means coupling said counter to said motor means to operate said motor means.

8. An electrical control system, comprising:
motor means having a pair of relatively movable members;
a program device;
a position transducer system coupled to said members and producing output signals indicative of increments of relative movement of said members;
a count-down counter having counter flip flops interconnected for count-down operation and having individual control flip flops coupled between successive counter flip flops for controlling the higher order flip flop in each case;
means coupled to said counter flip flops for setting said counter flip flops in their "1" representing electrical states;
means coupled to said control flip flops for setting said control flip flops in their "1" representing electrical states;
means coupling said program device to said counter flip flops to change the electrical state of selected counter flip flops to provide a predetermined count for said counter;
means coupled to said control flip flops to change the electrical state of selected control flip flops to provide a new predetermined count for said counter;
means coupling said position transducer system as input to said counter to count down said counter from said new predetermined count;
and means coupling the output of said counter to said motor means to control said motor means.

References Cited by the Examiner
UNITED STATES PATENTS

| 2,727,194 | 12/1955 | Seid. | |
| 2,878,434 | 3/1959 | Brown. | |
| 2,968,003 | 1/1961 | Apgar | 328—44 |
| 2,977,539 | 3/1961 | Townsend | 328—42 |

JOHN F. COUCH, *Primary Examiner.*